(12) United States Patent
Mattaway

(10) Patent No.: US 6,728,784 B1
(45) Date of Patent: *Apr. 27, 2004

(54) COLLABORATIVE MULTIMEDIA ARCHITECTURE FOR PACKET-SWITCHED DATA NETWORKS

(75) Inventor: Shane D. Mattaway, Boca Raton, FL (US)

(73) Assignee: Netspeak Corporation, Boca Raton, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 25 days.

(21) Appl. No.: 08/916,091

(22) Filed: Aug. 21, 1997

Related U.S. Application Data (60) Provisional application No. 60/034,231, filed on Jan. 6, 1997, and provisional application No. 60/024,251, filed on Aug. 21, 1996.

(51) Int. Cl.[7] ............................................. E06F 15/16
(52) U.S. Cl. ................. 709/245; 709/203; 709/204; 709/205; 709/202; 370/260; 370/261; 370/262; 379/205.01; 379/206.01
(58) Field of Search ........................ 709/204, 205, 709/203, 245, 202; 370/260–262, 200; 455/416; 379/265; 713/1

(56) References Cited

U.S. PATENT DOCUMENTS

| | | | | |
|---|---|---|---|---|
| 5,625,407 A | * | 4/1997 | Biggs et al. ................. | 370/260 |
| 5,642,156 A | * | 6/1997 | Saiki ........................... | 348/15 |
| 5,742,675 A | * | 4/1998 | Kilander et al. ............ | 379/265 |
| 5,767,897 A | * | 6/1998 | Howell ........................ | 348/15 |
| 5,964,872 A | * | 10/1999 | Turpin .......................... | 713/1 |
| 5,999,965 A | * | 12/1999 | Kelly .......................... | 709/202 |

OTHER PUBLICATIONS

Adrian Segall "Directories for Networks with Casually Connected Users", INFOCOM, IEEE, 1988.*

* cited by examiner

*Primary Examiner*—Jack B. Harvey
*Assistant Examiner*—Hien C. Le
(74) *Attorney, Agent, or Firm*—Kenyon & Kenyon

(57) ABSTRACT

A collaborative multimedia system includes a plurality of notebook processes operatively interconnected over a computer network to a conference server, and, an optional podium process capable of controlling the priority of communications within the conference. The notebook processes are capable of privately communicating with other conference participants in addition to participating in the conference. A sophisticated graphic user interface provides public and private whiteboard areas by which graphic information may be exchanged with other processes in a conference or over separate communication link.

6 Claims, 4 Drawing Sheets

COLLABORATIVE MULTIMEDIA ARCHITECTURE FOR PACKET-SWITCHED DATA NETWORKS

RELATED APPLICATIONS

This application claims priority to U.S. Provisional Patent Applications No. 60/024,251 entitled System and Methods for Point-to-Point Communications over a Computer Network by Mattaway et. al., filed Aug. 21, 1996, and U.S. Ser. No. 60/034,231 entitled Method and Apparatus for Broadcast of Data Over Computer Networks, filed Jan. 6, 1997.

In addition, the subject matters of the following related applications are incorporated herein by reference:

- U.S. Pat. No. 6,108,704 entitled Point-to-Point Internet Protocol, by Glenn W. Hutton, filed Sep. 25, 1995;
- U.S. Pat. No. 6,185,184, entitled Directory Server For Providing Dynamically Assigned Network Protocol Addresses, by Mattaway et al., filed Sep. 25, 1996;
- U.S. Pat. No. 6,721,316, entitled Graphic User Interface For Internet Telephony Application, by Mattaway et al., filed Sep. 25, 1996;
- U.S. patent application Ser. No. 08/719,891, entitled Method And Apparatus For Distribution And Presentation Of Multimedia Data Over A Computer Network, by Mattaway et al., filed Sep. 25, 1996;
- U.S. Pat. No. 6,131,121, entitled Point-to-point Computer Network Communication Utility Utilizing Dynamically Assigned Network Protocol Addresses, by Mattaway et al., filed Sep. 25, 1996;
- U.S. Pat. No. 6,226,619, entitled Method And Apparatus For Dynamically Defining Data Communication Utilities, by Mattaway et al., filed Sep. 25, 1996;
- U.S. patent application Ser. No. 08/719,898, entitled Method And Apparatus For Providing Caller Identification Based Out-going Messages In A Computer Telephony Environment; by Mattaway et al., filed Sep. 25, 1996;
- U.S. patent application Ser. No. 5,684,061, entitled Method And Apparatus For Providing Caller Identification Based Call Blocking In A Computer Telephony Environment, by Mattaway et al., filed Sep. 25, 1996;
- U.S. patent application Ser. No. 08/719,639, entitled Method And Apparatus For Providing Caller Identification Responses In A Computer Telephony Environment, by Mattaway et al., filed Sep. 25, 1996; and
- U.S. patent application Ser. No. 08/832,746, entitled Virtual Circuit Switching Architecture, by Mattaway et al., filed Apr. 4, 1997;
- U.S. patent application Ser. No. 08/911,133, entitled Method and Apparatus for Establishing Communications Between Packet-Switched and Circuit-Switched Networks, by Keith C. Kelly, filed Aug. 14, 1997;
- U.S. patent application Ser. No. 08/911,519, entitled Domain Name Server Architecture for Translating Telephone Number Domain Names into Network Protocol Addresses, by Keith C. Kelly, filed Aug. 14, 1997;
- U.S. patent application Ser. No. 08/914,714, entitled Automatic Call Distribution Server For Computer Telephony Communications, by Keith C. Kelly, filed Aug. 19, 1997; and
- U.S. patent application Ser. No. 08/915,034, entitled Method and Apparatus for Establishing Communications from Browser Application, by Keith C. Kelley et al., filed Aug. 20, 1997.

FIELD OF THE INVENTION

The invention relates, generally, to data processing systems and, more specifically, to a technique for enabling collaborative communications and data sharing over packet-switched data processing networks.

BACKGROUND OF THE INVENTION

Telephone conferencing systems over traditional public switched telephone networks are currently in widespread use. More recently, video conferencing systems enabling conferencing of video information over computer networks have beem implemented. Such systems typically allow participants to simultaneously receive and transmit audio and/or video information depending on the sophistication of the system. However, with the evolution of data processing technology which enables complex multimedia data types, such as animation, photographs, text, graphics, to be distributed via computer networks. A need exists for the ability to transmit complex multimedia data types among conference attendees to allow collaborative interaction. A further need exists for the ability for parties within a conference to communicate separate, and privately, without disturbing the parties to the conference, i.e. "going off line" temporarily. Further, a need exists for conference attendees to have the ability to share and view, in real-time text, graphics, data files, particularly for educational and informational purposes.

SUMMARY OF THE INVENTION

A collaborative multimedia system for use over packet-switched data networks comprises a plurality of notebook client processes and a conference server process operatively coupled to the network. The conference server enables replication of audio, video and other types of multimedia data packets to enable a conference to occur in a number of different modes. A podium process may be utilized to control the priority of communications within a conference. Notebook client processes, in addition to communicating in the conference, may establish private conferences with other parties within the conference as well as outside the conference. A sophisticated graphic user interface enables graphic information to be shared with both public and private whiteboard utilities.

BRIEF DESCRIPTION OF THE DRAWINGS

The above and other features, objects, and advantages of the invention will be better understood by referring to the following description in conjunction with the accompanying drawing in which.

DETAILED DESCRIPTION

Figure 1:
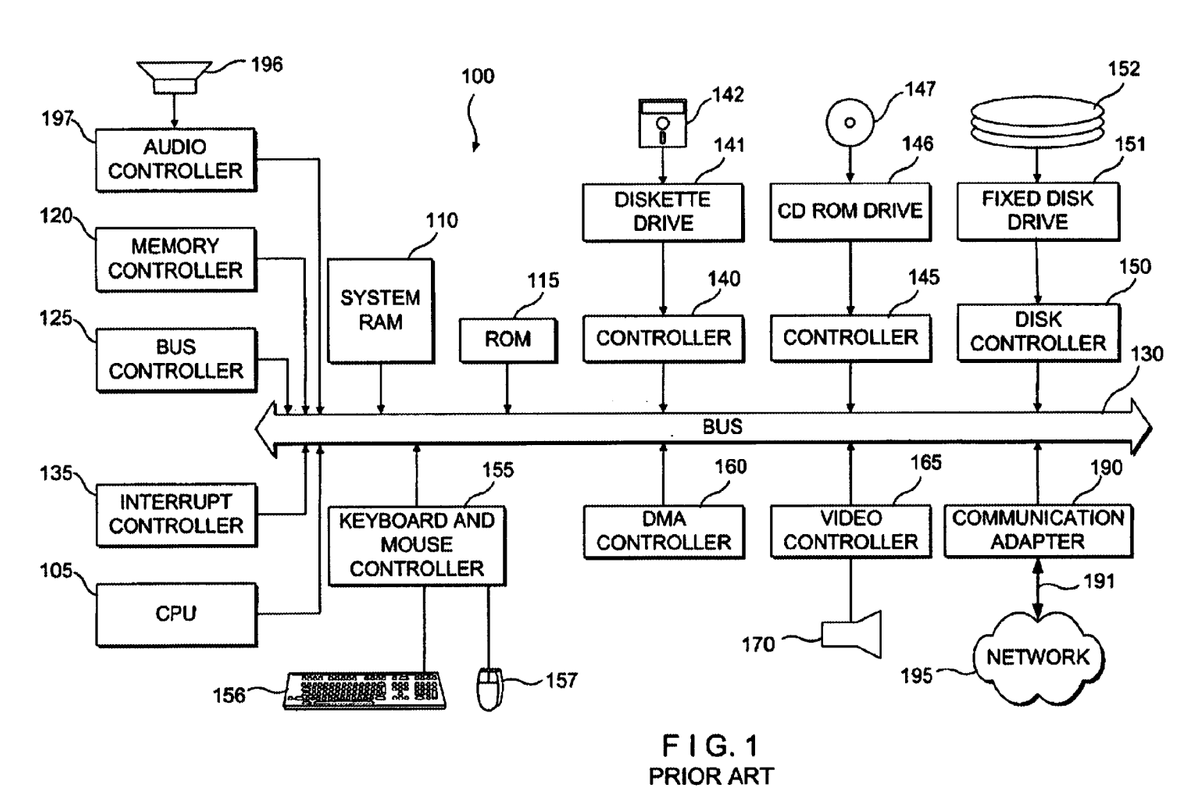
FIG. 1 is a block diagram of a computer systems suitable for use with the present invention.

FIG. 1 illustrates the system architecture for a computer system 100, such as an IBM PS/2® computer on which the invention can be implemented. The exemplary computer system of FIG. 1 is for descriptive purposes only. Although the description below may refer to terms commonly used in describing particular computer systems, such as an IBM PS/2 computer, the description and concepts equally apply to other systems, including systems having architectures dissimilar to FIG. 1.

The computer system 100 includes a central processing unit (CPU) 105, which may include a conventional microprocessor, a random access memory (RAM) 110 for temporary storage of information, and a read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components. Mass storage may be provided by diskette 142, CD ROM 147 or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices such as a pen and/or tablet and a microphone for voice input may be connected to computer system 100 through bus 130 and an appropriate controller/software. DNA controller 160 is provided for performing direct memory access to system RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Computer system 100 is generally controlled and coordinated by operating system software, such the OS/2® operating system, available from International Business Machines Corporation, Armonk, N.Y. The operating system controls allocation of system resources and performs tasks such as process scheduling, memory management, and networking and I/O services, among other things.

COLLABORATIVE MULTIMEDIA ARCHITECTURE

Figure 2:
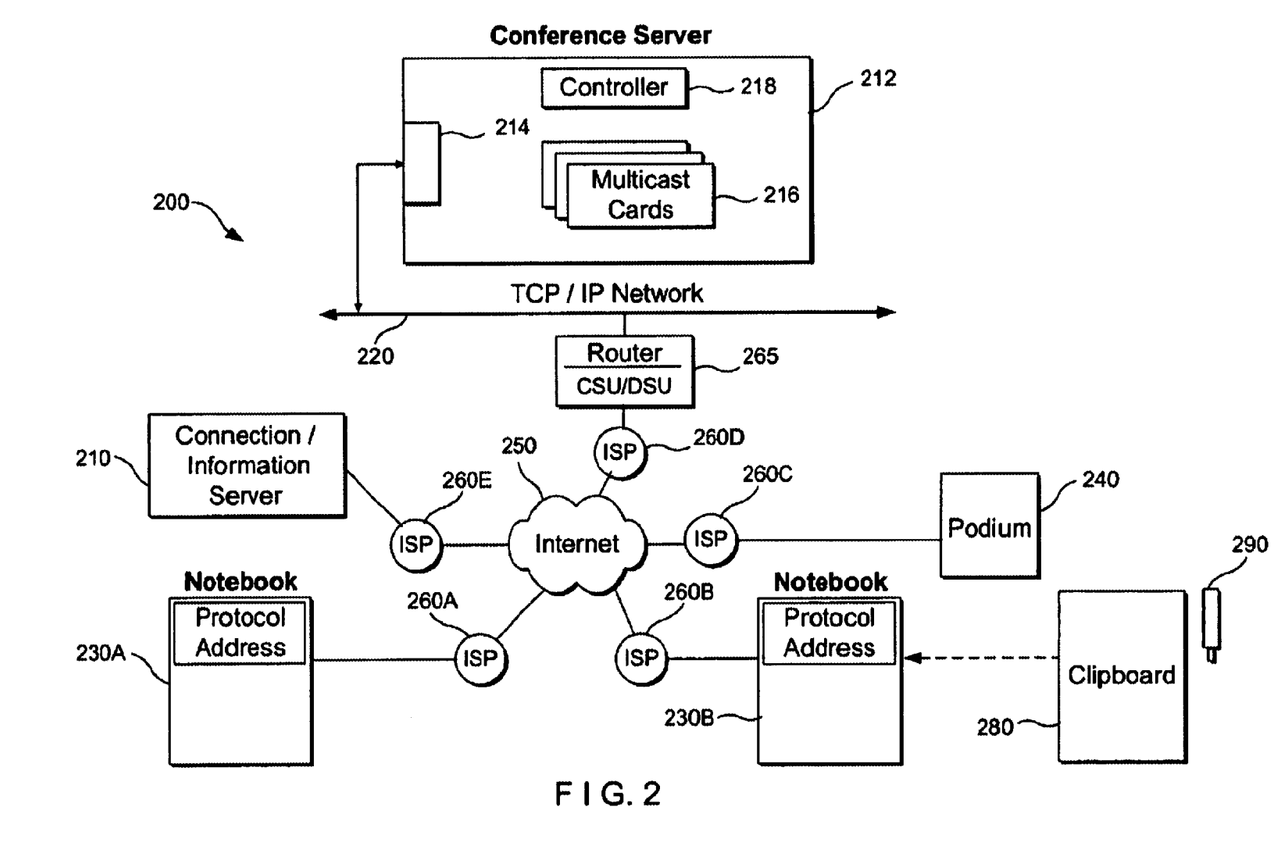
FIG. 2 illustrates conceptually a collaborative multimedia work architecture in accordance with the present invention.

A collaborative multimedia (CM) architecture environment is illustrated in FIG. 2. Specifically, a CM network 200 comprises a global connection/information server 210, a packet-switched data network 220, a conference server 212 coupled to network 220, a plurality of notebook client processes 230A–B, a podium client process 240, an Internet network topology 250, illustrated conceptually as a cloud, a plurality of Internet service providers 260, respectively connecting various other components of the system to the Internet cloud 250, and a router/CSU/DSU 265 coupling network 220 to one of the ISPs 260. Connection/information server 210 may be implemented as described in U.S. patent application Ser. No. 08/719,894, entitled Directory Server for Providing Dynamically Assigned Network Protocol Addresses, previously referenced and incorporated herein. A global server suitable for use as global server 210 is commercially available from NetSpeak Corporation in the form of a collection of intelligent software modules including connection server Part No. CSR1, information server, Model ISR1, and database server, Model DBSR1. Internet Service Providers (ISPs) 260A–E may comprise any number of currently commercially available Internet service providers such as America On Line, the IBM Global Network, etc.

Conference Server

Conference server 212 has an architecture similar to that described in U.S. Provisional Patent Application No. 60/034,231 entitled Method and Apparatus for Broadcast of Data Over Computer Networks from which this application claims priority. A conference server may be implemented as a MicroSoft Windows NT-based server process which utilizes the WebPhone application program interface as described in the previously-referenced co-pending patent applications. Server 212 may be implemented on a computer architecture similar to that described with referece to FIG. 1. The server further comprises a network adapter 214, and a plurality of programmable multicast adapter card 216 which may be implemented with any number of commercially available cards. Server 212 interfaces with Internet 250 over a dedicated T3 connection which is capable of supporting 15,360 simultaneous multicasts.

Conference server 212 may be implemented with the state-table architecture and has the primary function of receiving and replicating multimedia data packets for transmission to client processes as described herein. Conference server 212 registers its Internet protocol address with connection server 210. Connection server/information server 210 monitors which server 212, notebook clients 230 and podium clients 240 are involved in a conference, and how many channels are currently being used by the conference server. In addition, global server 210 monitors which notebooks 230 and podiums 240 are being used by a conference server and which notebooks. 230 are connected to a podium 240. The conference multicast server interfaces with the multicast cards 216 to supply the card with the Internet protocol addresses of incoming data and the Internet protocol addresses to which the replicated outbound data should be reflected or supplied.

Prior to describing each of the notebooks 230 and podium 240, a brief background of the WebPhone client process from which these processes are derived is supplied for the reader. Each of notebooks 230 and podium 240 comprise a WebPhone process with specialized graphic user interface and functionality to enable collaborative interaction over multiple communication connections simultaneously. The WebPhone client comprises a collection of intelligent software modules which perform a broad range of Internet telephony functions. The WebPhone client, Version 2.0 and thereafter, is commercially available from NetSpeak Corporation, Boca Raton, Fla. The structure and function of the WebPhone client, including its interaction with a connection server/information server, conferencing capability and interaction in a hybrid telecommunication environment, including with devices such as gateway and automatic call distribution centers, is described extensively in the previously-referenced co-pending patent applications and provisional patent applications from which this application claims priority.

The WebPhone software applications may run on the computer system described with reference to FIG. 1, or a similar architecture whether implemented as a personal computer or dedicated server. In such an environment, the sound card 197 accompanying the computer system 100 of FIG. 1, may be an MCI compliant sound card while communication controller 190 may be implemented through either an analog modem or a LAN-based TCP/IP network connector to enable Internet/Intranet connectivity.

The WebPhones, as well as any other apparatus utilizing the WebPhone Application Program Interface embodied therein, each have their own unique E-mail address and adhere to the WebPhone Protocol and packet definitions, as extensively described in the previously referenced U.S. patent applications. For the reader's benefit, short summary of a portion of the WebPhone Protocol is set forth to illustrate the interaction of WebPhone clients with each other and the connection/information server when establishing a communication connection.

Each WebPhone client, may serve either as a calling party or a callee party, i.e. the party being called. The calling party transmits an on-line request packet to a connection/information server upon connection to an IP-based network, e.g. the Internet or an Intranet. The on-line request packet contains configuration and settings information, a unique E-mail address and a fixed or dynamically assigned IP address for the WebPhone client. The callee party, also a utilizing a WebPhone client, transmits a similar on-line request packet containing its respective configuration and setting information, E-mail address and IP address to the same or a different connection server upon connection to an IP-based network. The calling party originates a call by locating the callee party in a directory associated with either its own WebPhone client or the connection/information server to which it is connected. The callee party may be identified by alias, E-mail address or key word search criteria. Once the E-mail address of the calling party is identified, the calling party's WebPhone forwards a request packet to the connection/information server, the request packet containing the callee party's E-mail address. The connection/information server uses the E-mail address in the received request packet to locate the last known IP address assigned to the callee party. The connection/information server then transmits to the calling party an information packet containing the IP address of the callee party. Upon receipt of the located IP address from the connection server, the calling party's WebPhone initiates a direct point-to-point communication link with the callee party by sending a call packet directly to the IP address of the callee party. The callee party either accepts or rejects the call with appropriate response packets. If the call is accepted, a communication session is established directly between the caller and the callee, without intervention of the connection/information server. The above scenario describes establishment of a communication link which originates and terminates with clients on an IP-based network.

The collaborative multimedia system 200 of the present invention comprises an interconnected network topology of service providers, i.e. connection/information server 210 and conference server 212 and one or more client processes, i.e. notebook 230, podium 240 and clipboard 280. The collaborative multimedia system enables users to interface remotely in a fashion analogous to behavior in the conventional meeting or classroom.

Clients are the terminal devices employed by users to transmit and receive multimedia over the CM System infrastructure composed of Services. This network infrastructure enables users to collaborate in a pier to pier or moderated fashion in scheduled meetings or classes. Collaboration takes the form of multimedia communications (voice, audio, video, animation, data.) between the participants in a meeting or class.

These communications are such that while a participant in a meeting or class is listening to and looking at the party who currently has the floor (i.e., control), he/she may simultaneously communicate with one or more other participants to talk and share information. Participants can carry on private voice/video conversations with one or more participants, work together on documents (Word, Excel, Corel . . . ), share a virtual public whiteboard, maintain private notes, exchange files and notes, record and playback meetings/classes and more.

A CM system 200 can accommodate hundreds of participants per meeting or class. The actual number is dependent upon the number of Conference servers 212 deployed and the bandwidth of the underlying physical IP network 220 and Internet 250.

The CM system 200 provides for two types of collaboration sessions, meetings and classes. Meetings are pier to pier collaborations in scheduled, multi-party Meetings where control is passed around amenably amongst the participants. Classes are mediated collaboration in scheduled, multi-party conferences where a moderator, e.g. instructor or speaker using a Podium client 240 controls who may take control of the class at any time.

The media exchange between participants in a meeting or class is handled by one or more conference service 212.

Podiums process 240 interface with Information Services provided by connection/information server 210 to create and manage scheduled classes. Classes may have participation fees with system controlled access. Notebook users may participate in classes by selecting classes and meetings from an information service. All valid participants in a scheduled class have, via their notebook 230, a view of a public whiteboard to which anyone who has the floor may contribute to, e.g., application sharing takes place on the whiteboard so only the party in control may effect a change. The floor is controlled by the podium process 240, typically the instructor.

Notebook users may schedule meetings and participate in meetings and classes by obtaining the schedule of classes and meetings on an information service. Meetings may also have participation fees with system controlled access. Notebook and podium users may be located anywhere within reach of the CM system 200, e.g., using a 28.8 Kb dial up connection to an Internet Service Provider over the Internet.

Notebook and podium users can copy, e.g. drag/drop files and objects into their workspaces, i.e., private notes and public whiteboard from the file system or applications respectively, copy objects between workspaces, transfer files to one or more other participants and record and playback meetings and classes.

Figure 4A:
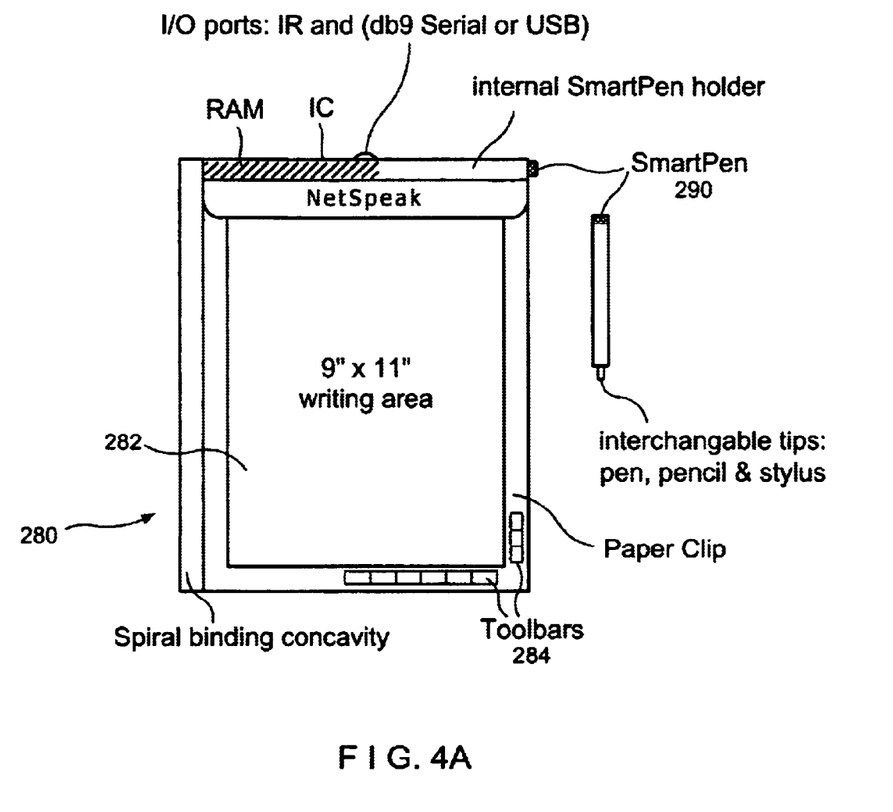
FIGS. 4A–B illustrate conceptually a clipborad an smart-pen in accordance with the present invention.
Figure 4B:
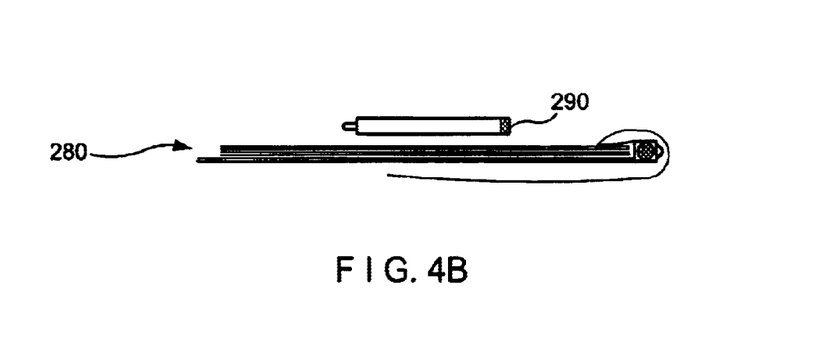

The Clipboard 280 comprises an intelligent physical device similar to a conventional clipboard in conjunction with its wireless Smartpen 290 adds another dimension to collaboration by enabling a user to take notes in the conventional manner, e.g. pen or pencil on paper. Clipboard 280 automatically replicates the notes into an associated Notebook process 230 on the users computer. Clipboard process 280 can retain numerous pages of notes in memory then upload them to an associated Notebook when brought into physical proximity. Users can be mobile without a computer and take notes all day using the Clipboard 280 and Smartpen 290 then upload them to their Notebooks later. The Clipboard and the Smartpen further provide access control to an associated Notebook thereby preventing unauthorized access to Notebook contents.

Notebooks 230 and Podiums 240 may have signature recognition and batch optical character recognition capabilities to enable the Clipboard user to sign documents with trusted validation, performed by a Connection service 210 and convert their notes into ASCII text and bitmap images.

CM systems 200 may be deployed by academic institutions, corporations, cable, telephone and other IP based network carriers to provide and resell these collaborative multimedia services. A CM system service provider may generate revenue from podium licensing, meeting and class carriage and participation fees, demographic advertising delivery fees and demographic based participation reporting fees, etc.

The CM system 200 provides a number of services to the notebook, podium and clipboard client processes, including connection services, information services, proxy services, credit processing service, message services and advertising services. Connection services are provided by connection server 210 which functions as a virtual circuit switch and establishes transport layer point-to-point Internet protocol functions in between CM clients and services. Connection server 210 further maintains information associated with each of the conference servers 212 and is responsible for managing the distribution of meetings and classes among conference servers based upon conference server loading and network loading. Information services are also provided by connection server 210. Such information services comprise maintenance of schedules for meetings and classes and user demographic information for client users.

Controller 218 of conference server 212 provides conferencing services in the form of audio packets mixing and dynamically reconfigurable, bidirection replication and transmission of audio, video, animation, text and other data type packets between client processes. Such services are provided utilizing the protocol and packet definitions defined in the previously referenced co-pending patent applications including the U.S. application entitled Automatic Call Distribution Server for Computer Telephony Communications by Keith C. Kelly, filed Aug. 19, 1997.

In addition, CM system 200 may provide additional services on separate processors not shown, such servers include proxy server 211 to secure communications through firewalls, database services to store transactions logged by other services, credit processing services to interface to credit card accounts, financial banking services to interface to bank accounts, messaging services to allow a client to store and retrieve messages. Such messaging service possibly including the ability to store notebook process notes as well as to reply, forward, edit and delete messages received from other notebook podium processes. In addition, advertising services may be provided to deliver demographically target multimedia advertising to notebook processes on behalf of podium processes.

Notebook Client

The notebook client 230, hereafter referred to as the notebook 230 as described previously may be implemented similar to a WebPhone client process with a specialized graphic user interface as described with reference to FIG. 3. The notebook client interfaces with conference server 212 using the conferencing packet descriptions and protocol from the previously referenced co-pending patent applications. In addition, the notebook interfaces with podium 240 and other notebooks online in a conference, or separate from the conference using the standard WebPhone protocol as also described in the previously referenced co-pending applications.

Notebook users can selectively speak with and see one or more other users in a meeting. Any number of simultaneous conversations amongst users in a meeting/class can exist. A user can establish and participate in one or more concurrent conversations amongst other users in a meeting/class. Users hear their conversations over the background of all the other conversations in a meeting/class. Notebook has a Mute switch.

Notebook enables the user to collaborate with the other participants in a meeting. The user can send and receive voice, video, animation, URLs and data with all the participants in a meeting.

Notebook users in a meeting or class can work together on a common application (Word, Excel, Visio, PhotoShop . . . ) and can copy files and exchange notes amongst the other participants under controlled access.

Notebook users may schedule meetings with a specified Information Service (IS). The meeting defines the date and time of the meeting, number of participants and a set of selected participants. The specified participants can be sent notifications of impending meetings as well as automatically called via built-in WP features to bring the participants to the scheduled meeting. Users can query the IS for the calendar of scheduled meetings and see which meetings they have established and which meetings their are invited to. Once obtained, the user can investigate the details of each meeting and create new meetings.

Notebook users may record and playback meetings and classes. The user has control over which media streams (audio, video, animation, data, whiteboard video monitor and notepad video monitor) are recorded (this allows controls over recorded meeting/class file size).

Graphic user interface 300 of notebook 230 may be implemented using MicroSoft Windows APIs and other industry standard protocols, such protocols and application program interfaces publicly available and understood by those reasonably skilled in the programming art.

Figure 3:
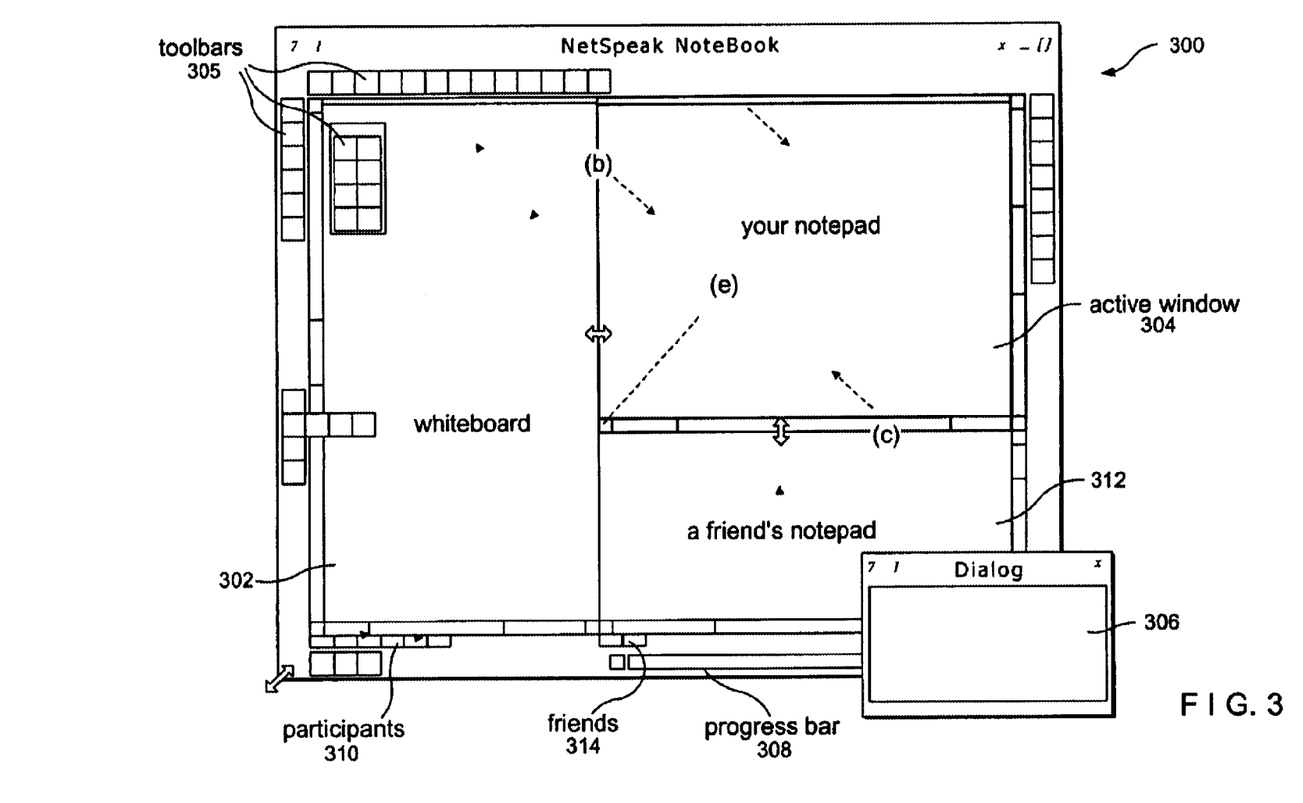
FIG. 3 illustrates the graphic user interface of a notebook client process in accordance with the present invention.

Referring to FIG. 3, a graphic user interface 300 or notebook 230 is illustrated. Graphic user interface 300 comprises a number of tool bars and delineated region used for selective private or public communications. Specifically, graphic user interface 300 has a public window region, hereafter referred to as whiteboard 302 and a private window region, referred to hereafter as notepad 304. In addition, graphic user interface 300 has the ability to display a dialog box 306 as illustrated. In addition, a notepad of the party to whom a notebook user is communicating, referred to hereafter as a friend's notepad 312 is delineated with the desktop of graphic user interface 300. Miscellaneous other graphic entities including tool bars 305 may further be implemented on graphic user interface 300.

In a meeting, users contribute to the whiteboard 302 by copying files from their file system or selected objects from their Private window into the whiteboard. Only one user in a meeting can move or delete the objects in the whiteboard. The whiteboard control should be shared amenably amongst the users in a meeting. This control is owned by the instructor at a podium in a class. Applications on the whiteboard are shared amongst the participants in a Meeting or Class.

A user in a meeting can selectively view the contributions made by one or more other users to whiteboard 302.

Whiteboard 302 has one main video monitor for you to see who has the floor. The video monitor automatically switches to display who is talking and enables the user to select the video of other users in a meeting/class, presented as thumbprint images.

The tabs 310 on whiteboard 302 represent the users in a meeting/class, one tab per user and one public tab. When a user tab is selected, only those objects contributed to the whiteboard by that user are displayed on the whiteboard. One or more user tabs may be selected concurrently thereby displaying only those objects contributed by the selected set of users on the whiteboard 302.

Files may be transferred amongst users in a meeting by dragging files from the file system and dropping them onto selected user tabs, allows for transfer to one or more users. A user who drops a file onto the Public tab transfers that file to all the users in a meeting/class.

The notepad 304 contains all the objects the user copied from the whiteboard 302, contributions from other users plus the files the user copied from the file system. These files consist of any application data files, images, sounds, videos, text and HTML.

Notepad 304 has one main video monitor to see who has the floor. The video monitor automatically switches to display who is talking and enables the user to select the video feed from friendly users in a meeting/class, presented as thumbprint images.

The tabs 314 on the notepad represent friends, i.e. friendly users which the user is in private communication with. A user can request to communicate with other users in a meeting/class and add them to his/her friends. A user grants another user permission to communicate upon request and can establish user specific communication blocking.

Frame Indicators

The notebook 230 always displays certain status indicators that inform the user of various operational status. These include informational messages, forwarded documents, file transfer status, control status, and awaiting reply indication.

Status and Information Messages

Status and information messages are displayed in the status bar area in the bottom border of the notebook frame. These messages keep the user update-to-date for any changes to the conference or local CM system 200.

Some of the messages posted are:

A user joins/leaves the conference

Conference mode changes between Conversational/Collaboration/Lecture

Local user gains/looses control of the Public area

A file transfer has completed

A connection failure has occurred

File Transfer Status Bar

A status bar is used to display the current file transfer status of all files being transferred or awaiting transfer collectively, more detail is available through the File Transfer Dialog.

Control Status

An indication image displayed in the notebook left frame shows the current control characteristics for the current user. This indicator can have a sound associated with it to play when control is granted to the local user. This indicator changes to reflect the status of:

Controller of the Public Area

Waiting for control of the Public Area

Currently active remote pointer

Request Pending

An indicator for showing when another user is awaiting a reply is also displayed in the notebook frame. The indicator changes to remind the local user to reply to the pending requests. This indicator can have a sound associated with it to play when a reply is pending.

User Tabs

User tabs are displayed at the bottom of the Public area and contain a tab for each contributor of objects within the current Public document, plus a permanent tab labeled "Public". In addition, any other users currently connected to the conference session are also listed. Selecting the Public tab causes all document objects to be displayed in expanded view. Selecting a tab of a user iconifies all objects not contributed by that user and expand all objects contributed by them.

Each tab displays the screen name and current status of the user it represents. Status is indicted by the presence and state of icons on the tab. The icons are used to show status for:

Current Public document controller

Users receiving files transfers from the local user

Users sending files transfers to the local user

Whether user is currently connected or not

Also, the user may right click on a tab to display additional information concerning the user indicated on the tab. This information includes:

Full name

Email address

Time user joined conference

Whether user is the Super User

Open or close a friendly notepad to user

Start up a Webphone call to that user

Send user a message

User tabs may scroll in to accommodate more users than can be viewed in the tab area.

Toolbars

The notebook contains the permanent tool buttons in the left border of the user interface frame and pop-up floating toolbars that can viewed temporarily or permanently. Toolbars are organized to contain a collection of functions that are most likely used together, such as font, color, properties, document, view, and control. Toolbars can be floating above the noteBook user interface or docked to either the left, top or right frame border.

Whether a tool remains selected from use to use, or reverts to the Selector tool is a user select-able property. Also, the ability to save the toolbar status on exit and restore the toolbars to the same status the next time the notebook is started is user configurable.

Frame Tool Buttons

Frame buttons are displayed permanently in the left border of the notebook frame. These buttons provide an obvious starting point for using the notebook. Frame tool buttons are, from top to bottom, Selector, Pencil, Text, Drawing Tools, Toolbars, Properties, File Transfer.

These Frame Tool Buttons perform the following functions:

Selector Chooses the mouse to be a selector tool used to choose one or more objects in a NoteBook document Pencil Chooses either the Pencil tool for the mouse pointer to draw freehand style Text Chooses the Text tool, by clicking in a NoteBook document a Text object is created and typing on the keyboard enters text into the object Drawing Tools Displays a pop-up toolbar from which a specific drawing tool can be selected and used by manipulating the mouse pointer in a NoteBook document Toolbars Displays a pop-up toolbar that allows the user to display or hide a set of toolbars from the following collection: Font, Color, View, Properties, Document, or Control Properties Displays the NoteBook property dialog box and permits the user to set a variety of properties File Transfer Displays the File Transfer dialog and permits users to transfer files or view the progress for all files currently being transferred Trash Can Any selected object may be dropped onto this button to have it deleted from a document. Clicking this button also deletes any selected objects in the current document. The delete function for the trash can removes objects from the document and lists so that later un-deletes can be performed. Right clicking on the trash can button permits the user to view deleted objects, un-delete an object or destroy deleted objects. Once destroyed, objects cannot be un-deleted.

Selector Tool

The Selector tool permits the user to select a single or multiple objects within a NoteBook document. To select a single object simply left click on the object and the object has a selection box drawn around it indicating that it is selected. Selecting multiple objects can be performed by either dragging a bounding box within a document thus selecting any contained objects or holding the control key down and left clicking on several objects. To deselect all objects, left click in an area of the document that contains no object. To deselect a single object hold the control key down and click on a selected object. To select all objects, right click any where on the document and select the Select All option from the pop-up menu.

The user may also configure the option to auto focus and select versus requiring a mouse click to focus and select. The auto focus and select option permits the document to be automatically selected as the mouse pointer hovers over a document pane and to select an object by hovering the mouse pointer over it. The hovering time can be configured by the user to suit their preferences.

Pencil Tool

This tool allows the user to draw freehand style in a document using various colors and line thickness. Pencil objects can be selected, properties altered, or moved to a different location. Relative display layer (foregound/background) can also be set.

Text Tool

Permits the user to enter a text object into a document. Text can be formatted using available fonts and drawn in color. Text objects can be selected, properties altered, or moved to a different location. Relative display layer (foregound/background) can also be set.

Drawing Tools

The drawing tools frame button displays a pop-up toolbar permitting the user to choose a drawing tool to use within documents. This toolbar can be dragged and docked to a NoteBook border or moved to a floating position. If the toolbar is not moved, it disappears when a specific tool is chosen.

The available drawing tools are:

Line Draws a single line between two mouse pointer selected points

Ellipse Draws an ellipse around a point selected by the mouse pointer

Rectangle Draws a rectangle between two mouse pointer selected points

Polygon Draws a multiple sided closed polygon

Polyline Draws multiple connected lines between mouse pointer selected points

Toolbars

This frame button displays a pop-up toolbar containing control buttons for the various working toolbars available. Selecting one or more buttons displays or hides the associated toolbar. If a toolbar is currently displayed, the associated button is initially depressed. This toolbar can be dragged and docked to a NoteBook border or moved to a floating position. If the toolbar is not moved, it disappears when a the mouse is moved away from it.

Font

The Font toolbar permits the user to select the current font or change the font of a selected object(s). The user may select any font installed on their system, however, when an object associated with a font is transferred over to a remote user that does not have the font installed, the object uses the currently selected font of the remote user to display the object on their machine. This toolbar consists of the following components:

Font A drop-down combo box listing all available fonts

Size The point size for the selected font listed in a drop-down combo box

Bold A two state button indicating whether or not the font is drawn as bold

Italic A two state button indicating whether or not the font is drawn as italic

Underline A two state button indicating whether or not the font is drawn as underlined Color This toolbar displays a scrolling set of buttons from which the user can select one. Each button displays a color and is depressed if the color is the currently selected color for drawing tools, pencil or text objects. This toolbar changes to the selected object current color if a single object is selected or revert to the most recent user selected color if no object is selected. The selected color button is always scrolled into the current toolbar view.

View

The user may alter their view of a document by choosing to show all objects as icons, show all objects in a fully expanded mode, selecting to zoom in or out of the document, or viewing a list of objects and their properties in a separate dialog window. A list of options follows:

Iconify View all objects in the current document as icons. Icons are small graphic representations of the type of data in the object (graphic, drawing, web page, etc.) displayed with the object name and the name of the contributing conference member. Vertical display compression is performed in order to fit as much as possible in the document view.

Expanded View all objects in fully expanded size.

Zoom Enlarge or shrink the view of the current document

List Display all items in a tree control where each node is an document object labeled by the object name. Expanding the node provides sub-nodes containing detailed information about the object such as contributor name, contribution time, position within document, etc.

In addition, each individual object can be changed in the following ways:

Iconify Display object as an icon

Expand Display object fully

Show Make object visible or invisible

Foreground Display object in the foreground, on top of other objects

Background Display object in the background, behind other objects

Resend Refreshed object on all remote connected NoteBooks

Document

A NoteBook document can be saved to disk and reviewed off-line at a later time. It may also be printed and have new "sub-document" objects inserted into it such as World-Wide-Web pages and shared objects. Edit functions can also be performed such as cut, paste, copy, undo, and redo. These functions are supported:

New Creates a new, empty document

Save Saves the document using the current document name, if this is a new document without a name the NoteBook requests a file name from the user before saving Save-As Saves the current document under a new file name specified by the user Print Prints a hard copy of the current document, printing can be performed from any view mode to print a representation of that view mode New Browser Object Inserts a new World-Wide-Web object into the current document after first requesting an URL specification from the user New Share Object Inserts a new shared application object into the current document, the user simply clicks on any currently running application to share it with other users Copy Copies any selected objects to the clipboard Paste Pastes the contents of the clipboard into the current document Cut Removes any selected objects from the current document and puts a copy of them on the clipboard Undo Undoes the most recent edit operation (insert, cut, move, object property change)

Redo Re-does the most recent Undo operation

Control

Control in perspective of the NoteBook refers to the ability of all current users in a interact in a well defined, orderly fashion. The Control functions refer only to the Public document area and provides a contention resolution protocol to prevent conflicting operations within it. Such a protocol is necessary in order to prevent, for instance, two users moving the same object at the same time to different locations, or even one user deleting an object that another user is currently moving.

The following rules are imposed on the Public Area document:

1. Only one user may move, delete or change the properties of objects at a time
2. No user can gain control if another user currently has control until control is yielded
3. Exception to rule 2 is when a Super User, such as a lecturer, exerts Immediate Control
4. Pending control requests are resolved using request time order The aspects of control covered by these options are:

Gain Attempts to gain control over the Public Area document

Yield Yields control over the Public Area document

Synchronize Causes all currently attached users to have their Public Area documents synchronized so that each has identical object contents Remote Creates a remote pointer with appears in all remote users Public Pointer Area documents that moves in response to the local uses control Tool Properties Various properties of tools can be selected using this toolbar. It displays a button for each type of property. By clicking the Property Type button, a pop-up toolbar is displayed graphically showing the detail options for that Property Type.

Selecting one of the detail options applies it to currently selected objects or set it as the current default value. The Property Types and their detailed options are:

Line Style Solid, Dashed, Dash-Dot, or Dotted

Line Thickness Hairline, Thin, Normal, Double, Thick

Line Arrow None, Origin, Destination, Double

Fill Empty, Solid, Stripped, Hatched

Properties

The NoteBook can be configured in many ways to customize the look, feel and operations to help the user create an environment best suited for their needs and habits. Areas for property definitions are:

Personal Information concerning the local user

Tools Web browser selection and tool default color selection

Appearance Default color settings for document backgrounds and caption bars

Preferences Display and behavior options

Public Document Display characteristics for the Public document

Private Display characteristics for Private documents

Document

File Transfer

Files may be transferred from user to individual user or broadcast to all other users. This frame button displays the File Transfer Management dialog window showing all currently transferring files and their status. The dialog shows the current status, the destination or source user name and filename for each file currently or waiting to be transferred from or to the local user. While the a received file is in the original directory and has not been changed, the NoteBook maintains source information on that file so that the local user may determine from whom and at what time files were received. Drag and drop from the File Transfer Dialog to the file manager in order to copy/move files to new directories. Also, the user may drag and drop files from the file manager to the File Transfer Dialog and transfer them.

When a file is attempted to be transferred to a user, the receiving user is always informed by a pop-up dialog indicating the user's name who initiates the file transfer, the file size and the file name. The receiving user may refuse the file transfer, specify a new file path and name or simply acknowledge the file transfer to have the file be transferred to a work directory. Before files are transferred to a receiving user, the destination disk is checked to determine that enough space is available to store the file, if not, the user is warned and allowed to change the file destination disk.

File transfer may also be initiated by drag and dropping files from the file manager onto any user tab on the lower boundary of the document area. Dropping file(s) onto the Public tab causes the files to be transferred to all currently connected users. Dropping file(s) onto a user tab causes the file(s) to be transferred just to the user indicated by the tab.

File transfer is performed in the NS Communication Engine which treats file data lower in priority than video which is lower in priority than voice. Thus, transferring files never impacts the quality of conversation or video. Also, files transferred from user to user are done so without the knowledge of other users.

Signature Recognition and Validation

Signature recognition can be performed from the NoteBook to provide additional assurance for validating authenticity of the user.

Batch OCR

As the user contributes hand-written notes using the NS-Clipboard, they are stored in the NS-Clipboard memoryand batch transferred by an integrated OCR process to a text representation and stored as personal notes attached to-the current NoteBook document. This process allows for the user to write notes in free hand and store those notes on the NS-Clipboard using onboard memory when the NS-Clipboard is not in communication with the computer. As communication is re-established between the NS-Clipboard and the computer running the NoteBook, any stored hand-written notes are downloaded to the computer and batch processed using an NoteBook incorporated OCR processing capability. This process results in ASCII text that is subsequently stored as notes and associated with the current NoteBook document.

Private Notes Management

Notes that are entered by a user via the NS-Clipboard or keyboard are associated with the current public document. Each note entered is attached to the current position in this document. Notes are stored in separate files containing references to the corresponding NoteBook document and position within the document for each note. This mechanism provides for the public document to be easily shared as a separate file while the users' personal notes are kept personal for their private usage.

Playback Capability

Each session of the NoteBook can be recorded and saved for later review. A saved document can be played back using the NoteBook to re-enact the recorded session. The sound, video and data can be selectively recorded and saved to a document. During playback, the document is visually re-built as the audio and or video are played. Objects can be seen as contributed and changed as they were in the original session. The playback session can be stopped at any time, reversed and fast forwarded to facilitate the review process. Also, the playback can take place with or without audio or video.

Document Forwarding and Retrieval

NoteBook documents are saved as files on the user's computer and may be forwarded with or without the users' private notes to other persons. Current documents for courses and other publicly distributed documents can be retrieved from the NS-MessageService and used off-line for course study and review.

Scheduling

The NoteBook System provides a scheduling functionality to inform users of the availability of courses. The schedule provides information concerning the time, class size, currently registered students and other features concerning the course. Using this information, courses can be subscribed to and documents concerning these courses may be accessed.

Integrated WebPhone Functionality

In order to use the audio communications in conjunction with the NoteBook functions, WebPhone functions are built into the NoteBook interface. Such an integration provides for convenience of connecting to other individuals within a public session to establish a personal channel to them. These channels can include more than two users, however, each user must individually initiate or receive a friendly invitation. These channels provide a means for a user to share information between one or more of their associated friends. Such shared information is private to those connected friends and cannot be viewed by other members of the NoteBook session.

Initiating a Call

To initiate a call to a member in the current session, a user can right click on any currently connected users tab in the public area and select the option to place a call to that user. If the remote user accepts the call, they are added to the friends area with a tab containing their name.

Answering a Call

A user sees that another session member is placing a call to them via an flashing icon on the initiating users public tab. An optional audible ringing sound can also indicate an attempted connection. The user can answer the call by right clicking on the public tab and selecting the receive call option. Accepting the call will add the calling user to the friends area with a tab containing their name.

Do Not Disturb

At any time, a NoteBook user may select a do not disturb characteristic for any potential connections from other session users by right clicking on a tab and selecting the do not disturb option. From that time on, any attempted remote connection will be refused automatically. This characteristic may be de-selected in a similar fashion, also, by applying this option to the public tab, connection attempts from all users will be refused.

Message Notification

During the operation of the NoteBook, a frame indicator displays the status of any waiting messages or forwarded documents. A listing of these notifications can be viewed by clicking on the frame indicator button to bring up a listing window containing the time, type and originator of all waiting messages and documents.

Video Display Operations

During a NoteBook session, the public video monitor window displays video of the currently speaking session member. Appropriate time outs and control mechanisms will prevent the video from constantly changing the video display to avoid confusing and rapid video switching. Another video window may be displayed for an established friend session that shows the currently speaking friend or the user may select to fix the video on a specific friend's video.

Configuration

The NoteBook user configuration information provides a way for the NoteBook System system to identify and characterize the members of a session and to determine the interest of the user for potentially interesting document and course postings. At installation time, configuration data is collected from the user and stored in the system registry. These items can be changed by the user at any time through the properties dialog. These items include:

Name

Address

Email address

IP address

NoteBook user name

Occupation

Annual income

Instructional interests

Podium

The podium may be implemented as a Windows 95/NT based software application which enables users to create, manage and instruct classes, have classes on any reachable CM system 200, obtain money from participants pay money to a CM system services for audience amplification, participant demographic reports, to attract advertising or other funding and demographically targeted multimedia advertising. The podium can function as jukebox of recorded classes available for reference, e.g., to replay a missed class.

The podium client is similar in implementation and function to the notebook client except for the ability to distribute control packages essentially controlling the floor in a conference to whomever the podium user directs.

Referring to FIG. 4, a clipboard 280 and smart pen 290 are illustrated. Clipboard 280 comprises an amount of RAM memory, a processor, and the required IO ports, preferably integrated on one or more integrated circuit chips for durability and compactness as illustrated. The display area of clipboard 280 may comprise a writing area 282 and a toolbar 284, as illustrated.

The ClipBoard 280 is a pen and tablet accompaniment for the notebook 230 which provides an integrated hardware-software combination for graphical and textual communication with users via a TCP/IP network. Clipboard 280 uses the latest circuitry technologies to provide a roughed tool with which the user can naturally interact with the notebook 230 and other programs. Some features of the clipboard are:

- Battery-less and cordless pen device
- Solid state ultra-thin tablet
- Pressure sensitive pen
- High coordinate transfer rate
- Interchangeable pen tips (ink, pencil, stylus)
- Integrated pen holder
- Full size paper tablet clip (accommodates spiral notebooks)
- Integrated toolbars matching the NoteBook functions
- Infra-red, serial or USB connection with computer
- Infra-red option has inductance charger and power level indicator
- Infra-red option has memory storage to maintain pen strokes minus connection
- Tablet has grid pattern to facilitate graphic object drawing Additional features incorporated in the pen design provide for security and user recognition in the case of multiple users are accessing the same tablet device. These are:

- Each pen can be programmed via the tablet to have a unique ID
- NoteBook program can then recognize pens by their pre-registered users
- NoteBook can control which pen can do certain functions in the NoteBook
- User's computer keeps the password for the pen and can re-register an old or new pen Also, tablet function template overlays for NoteBook, WebPhone, etc., are available that define areas on the tablet that are activated to perform pre-defined program operations.

A software implementation of the above-described embodiments may comprise a series of computer instructions either fixed on a tangible medium, such as a computer readable media, e.g. diskette 142, CD-ROM 147, ROM 115, or fixed disk 152 of FIG. 1A, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. Further, many of the system components described herein such as the client application and the gateway have been described using products from NetSpeak Corporation. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

What is claimed is:

1. A collaborative system for use with a plurality of computer processes and servers interconnected by a packet-switched computer network comprises:

a plurality of client processes, each client process is executed on a client computer and coupled to the computer network and addressable by a network protocol address dynamically assigned upon connection to the computer network, the plurality of client processes configured to forward to a connection server a respective network protocol address at which the client process is connected to the computer network each time connection to the computer network is established, wherein the dynamically assigned network protocol address is stored at the client computer;

the connection server operatively coupled to the computer network and capable of maintaining a compilation of entries, selected of the entries comprising a network protocol address assigned to a respective client process upon connection to the computer network; and a conference server operatively coupled to the computer network and responsive to one or more of the client processes for enabling conferenced communications among the client processes to which communication links are established.

2. The collaborative multimedia system of claim 1, further comprising:

control process, operatively coupled to the computer network and the conference server, for controlling the priority of communications in a conference among the plurality of client processes.

3. The collaborative multimedia system of claim 1, wherein one or more client processes on a conference communication may communicate individually on a separate communication link.

4. A system for use with a plurality of computer processes interconnected by a packet-switched computer network, each process being executed on a client computer and coupled to the computer network and addressable by a network protocol address which has been dynamically assigned upon connection to the computer network, the system comprising:

a connection server operatively coupled to the computer network and capable of maintaining a compilation of entries, selected of the entries comprising a network protocol address received from a process each time connection to the computer network is established, the network protocol address assigned to a respective process upon connection to the computer network, wherein the dynamically assigned network protocol address is stored at the client computer; and a conference server operatively coupled to the computer network and the connection server and responsive to one or more of the processes for enabling conferenced communications among the processes to which communication links are established.

5. The system of claim 4 further comprising:

a control process, operatively coupled to the computer network and the conference server for controlling the priority of communications in a conference among the plurality of processes.

6. The system of claim 4 wherein one or more processes on a conference communication may communicate individually on a separate communication link.

* * * * *